United States Patent [19]

Tsutsui et al.

[11] Patent Number: 4,867,573
[45] Date of Patent: Sep. 19, 1989

[54] POWDER TREATING METHOD AND APPARATUS USED THEREFOR

[75] Inventors: Koichi Tsutsui, Kyoto; Shoji Ikeda, Osaka; Koji Nishizawa, Osaka; Makoto Yagi, Osaka; Nobuaki Kubo, Osaka, all of Japan

[73] Assignee: Nippon Paint Co., Ltd., Osaka, Japan

[21] Appl. No.: 63,954

[22] Filed: Jun. 19, 1987

[30] Foreign Application Priority Data

Jun. 20, 1986 [JP] Japan .................................. 61-145922
Jun. 20, 1986 [JP] Japan .................................. 61-145923
Apr. 21, 1987 [JP] Japan .................................. 62-098975

[51] Int. Cl.$^4$ ........................... B01F 11/00; B01J 8/18
[52] U.S. Cl. .................................... 366/114; 118/620; 204/165
[58] Field of Search .............. 118/620, 600, 612, 50.1; 106/288 Q; 366/114, 115, 124, 139, 143, 149, 219, 108; 204/165

[56] References Cited

U.S. PATENT DOCUMENTS

| | | | |
|---|---|---|---|
| 2,143,610 | 1/1939 | Muller et al. ....................... | 366/114 |
| 3,386,843 | 6/1968 | Jaffe et al. . | |
| 3,485,591 | 12/1969 | Evans et al. . | |
| 3,539,117 | 11/1970 | Sjogren ............................ | 366/219 X |
| 3,916,826 | 11/1975 | Knudsen . | |
| 4,008,685 | 2/1977 | Pierce . | |
| 4,011,832 | 3/1977 | Westervelt et al. . | |
| 4,073,265 | 2/1978 | Walling et al. . | |
| 4,264,393 | 4/1981 | Gorin et al. ..................... | 118/620 X |
| 4,288,165 | 9/1981 | Fewel ................................. | 366/124 |
| 4,339,326 | 7/1982 | Hirose et al. ................... | 118/620 X |
| 4,344,981 | 8/1982 | Imada et al. . | |
| 4,450,787 | 5/1984 | Weakliem et al. .............. | 118/50.1 X |
| 4,478,643 | 11/1984 | Kuwahara et al. . | |
| 4,526,644 | 7/1985 | Fujiyama et al. .............. | 118/50.1 X |
| 4,548,867 | 11/1985 | Ueno et al. . | |
| 4,579,623 | 4/1986 | Suzuki et al. ................... | 118/620 X |
| 4,685,419 | 8/1987 | Nakajima . | |

FOREIGN PATENT DOCUMENTS 2528438 6/1986 France .
58-217559 12/1983 Japan .

OTHER PUBLICATIONS

"Surface Modification of Pigments By Low Temperature Plasma Treatment", Chemical Abstracts, vol. 102, No. 4, Jan. 1984, p. 98, Abstract No. 26414n.

Primary Examiner—Harvey C. Hornsby
Assistant Examiner—Scott J. Haugland
Attorney, Agent, or Firm—Armstrong, Nikaido, Marmelstein, Kubovcik & Murray

[57] ABSTRACT

The powders such as pigments are treated with the low temperature plasma so that their chemical property is improved. In low temperature plasma treatment, if a plurality of powders coagulate into one lump, or if powders cohere on the vessel's inside wall surface, it is difficult to make uniform and efficient treatment. The present invention provides a powder treating method and apparatus used therefor which make uniform and efficient treatment of powders with low temperature plasma. The first invention is a powder treating method where the powders are treated with low temperature plasma while stirring them by vibration. The second invention is a powder treating apparatus equipped with a treating chamber for housing powders, a device for vibrating this treating chamber and a plasma producing device, in which the powders in the treating chamber are treated with low temperature plasma while stirring them by vibration. While the treating chamber is formed by upper and lower two vessels with their opening mated to one another. An insulator is provided at a junction between these two vessels so as to electrically insulate the upper and lower two vessels, so that these two vessels may be utilized as mutually facing exciting electrode and grounding electrode. The third invention is a powder treating method where the powders are treated with low temperature plasma while being stirred by a precessional movement of a spiral screw which is being rotated.

8 Claims, 10 Drawing Sheets

POWDER TREATING METHOD AND APPARATUS USED THEREFOR

BACKGROUND OF THE INVENTION

The present invention relates to methods for treating powders of pigment, etc., and an apparatus used therefor.

Powders used to coatings, particularly pigments, etc., if their surfaces are chemically inert, can not be thoroughly dispersed in vehicles, etc. In this situation, in order to improve the chemical property of the powder surface, its surface treatment by use of low temperature plasma has been contemplated. For such low temperature plasma treatment of powders, a method of treating powders with low temperature plasma, while rotating or swinging a drum in which they are put, or a method of treating powders with low temperature plasma, while stirring them by such a means as an impeller, magnetic stirrer, etc., and so forth appear, for example, in Unexamined Patent Publication Nos. 56-155631, 57-177342, 58-205540 and 59-145038. However, depending on the type of powders, when a method such as by stirring, rotating, swinging, or the like is used, the so-called granulation, or coagulation of a plurality of powders into one lump, or cohesion of powders on the vessel's inside wall surface tends to occur; thus it was difficult to make uniform and efficient treatment.

OBJECTS OF THE INVENTION

The present invention has been conceived in view of this situation and its object is to provide a uniform and efficient powder treating method and an apparatus used therefor.

SUMMARY OF THE INVENTION

In order to attain the above-mentioned objects, the first invention resides in a powder treating method characterized in that powders are treated with low temperature plasma, while stirring them by vibration. The second invention lies in a powder treating apparatus, being an apparatus equipped with a treating chamber for containing powders, a device for vibrating this treating chamber and a device for producing plasma, in which the powders in the aforementioned treating chamber are treated with low temperature plasma, while stirring them by vibration. While the aforementioned treating chamber is formed by upper and lower two vessels with their openings mated to one another, an insulater is provided at the junction between these upper and lower vessels, to electrically insulate them from one another, so that these two vessels may be utilized as a mutually facing exciting electrode and grounding electrode. The third invention lies in a powder treating method characterized in that powders are treated with low temperature plasma, while being stirred by a precessional movement of a spiral screw which is being rotated.

DETAILED DESCRIPTION OF THE INVENTION

First, the powder treating method, being the first invention, is described in detail in reference to drawings illustrating a powder treating apparatus used in exercising it.

It should be noted that in conducting the powder treatment of the present inventions, if the water content in the powders is removed by subjecting the powders before treated to a drying treatment under heating or under reduced pressure, etc., the fluidity of the powders inside the apparatus is enhanced, resulting in further improved treatment efficiency. And also, if the powders are classified by particle diameters, the fluidity of the powder is likewise enhanced, resulting in improved treating efficiency. Most preferably, both of these two pretreatments are performed, but making either one of them only will do. With some types of powders, none of these pretreatments need to be performed. That is to say, according to the present inventions, the necessity of the pretreatments is not particularly defined.

Figure 1:
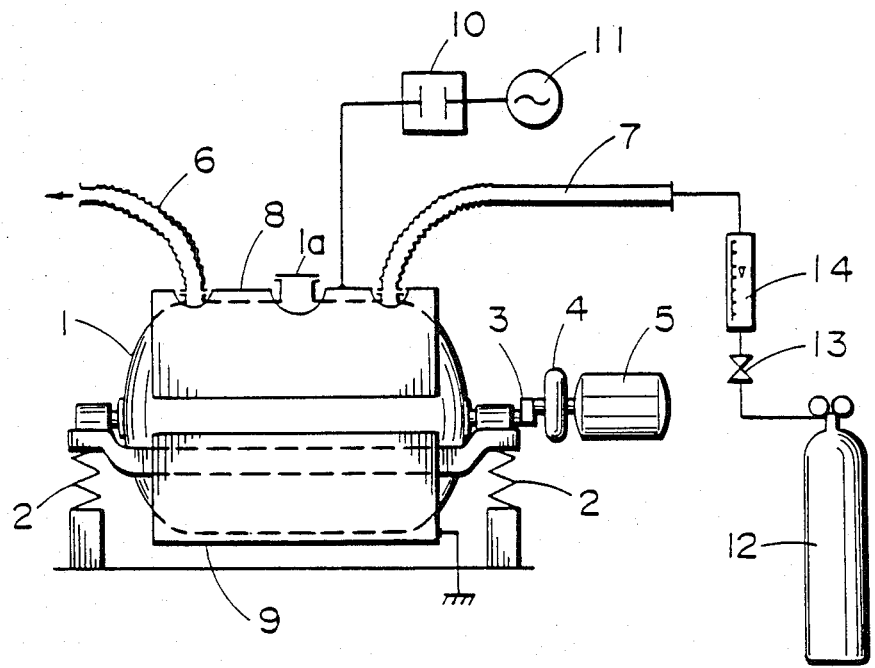
FIG. 1 is a diagram for explanation of an example of apparatuses based on utilization of high speed rotational vibration of those used for exercising the powder treating method being the first invention.

Use of the apparatus of FIG. 1 is described:

This apparatus is based on application of the structure of a vibrating mill which is normally used for pulverizing a solid substance. Thus a treating chamber 1 corresponding to the pulverizing cylinder of the vibrating mill is held on springs 2 so as to make a high speed circular vibration by the revolution of a motor 5 connected thereto through an eccentric shaft 3 and a rubber joint 4.

To this treating chamber 1, there are connected an exhaust pipe 6 linked to an exhaust system for keeping the inside of this treating chamber in a reduced pressure state and a gas pipe 7 for leading the gas used for the treatment into this treating chamber 1. These two pipes 6 and 7 are formed of whatever material, but they need to be of a structure such that they do not transmit vibration to the aforementioned exhaust system or gas supply section. As such a structure, a flexible tube or the like may be mentioned, but it is not restricted thereto.

The inside wall surface of this flexible tube or the treating chamber 1 is preferably subjected to a treatment for making the surface inert. As such inactivating treatments, there may be mentioned glass lining or TEFLON (Polytetrafluoroethylene produced by Du Pont) coating for the treating chamber 1 inside wall surface, TEFLON coating for the flexible tube inside wall surface, respectively.

In this example, the low temperature plasma for treating powders is to be produced by the RF (radio frequency wave) discharge from a pair of electrodes 8 and 9 so placed above and below the treating chamber 1 as to cover it. Of the pair of electrodes 8 and 9, the upper electrode 8 is an exciting electrode to which an RF power source 11 is linked through a matching unit 10, and the other electrode 9 a grounding electrode.

Before using this apparatus, after first introducing the powders to be treated through a hatch 1a into a treating chamber 1, the air in the treating chamber 1 is exhausted in the direction arrow-marked in the drawing through an exhaust pipe 6 by an exhaust system not shown in this drawing, thereby bringing the inside of the treating chamber 1 into a state of reduced pressure of the order of $10^{-1} \sim 10^{-2}$ Torrs.

Simultaneously therewith, high speed rotational vibration of the treating chamber 1 is started by turning the aforementioned motor 5. The conditions of the high speed rotational vibration, which are not particularly limited in this example, is preferably the number of revolutions of the motor being in a range of 600~2,400 rpm (10~40 Hz, as calculated into vibration frequency) and the amplitude 2~10 mm. Under this high speed rotational vibration, the powders put in this treating chamber 1 make a movement, while individually receiving violent impact shearing action.

The calculation of the number of revolutions of the aforementioned motor 5 into vibration frequency is made on the following concept. Thus when the number of revolutions is 1,000 rpm, the vibration is believed to occur 1,000 times in 1 min. Then the frequency per 1 sec., that is, the vibration frequency (Hz), is given by dividing the aforementioned number of revolutions by 60 to be a value of 16.7 Hz.

Then the gas for producing plasma is led in from a cylinder 12 joined to one end of the gas pipe 7, to set the gas pressure inside the reaction chamber 1 to a specified value. In this figure, 13 denotes a valve for adjusting the amount of the gas supplied from the cylinder 12 to the gas pipe 7, and 14 a flow-meter for detecting the amount of the aforementioned gas.

The gas for producing plasma is not particularly limited according to this invention. For example, any of the undermentioned ones may be selected according to the use.

Reactive or nonreactive gases such as air, hydrogen, oxygen, ammonia, carbon dioxide, carbon tetrafluoride, nitrogen, argon, helium or the like inorganic gases or propylene, benzene, vinyl monomer or the like organic gases, etc.

The gas pressure in the reaction chamber 1, which is not particularly limited in this example, is preferably within a range of 0.01~10 Torrs or more preferably, 0.05~5 Torrs, when the aforementioned gases are used, for example. The reasons why the pressure inside the treating chamber 1 is preferably set within the aforementioned range are as follows:

Thus if the gas pressure inside the treating chamber 1 is lower than 0.01 Torr, there is a possibility that high treating effect could not be achieved, because the concentration of the active species produced by the low temperature plasma atmosphere is insufficient. On the other hand, if the gas pressure inside the treating chamber 1 exceeds 10 Torrs, the so-called mean free path becomes too short, resulting in difficulty producing the low temperature plasma, or even if it is produced, because of its instability, it tends to be impossible to achieve high efficiency of treatment. On the contrary, if the gas pressure inside the treating chamber 1 is within the aforementioned range, it is believed possible to obtain stable low temperature plasma atmosphere, which will enable attainment of high efficiency of treatment.

After setting the inside of the treating chamber 1 to a specified gas pressure, as hereabove defined, RF is applied on the electrode 8 by operating the RF power source 11, to excite the aforementioned gas in the treating chamber 1, thereby producing the low temperature plasma atmosphere.

The RF frequency applied on the exciting electrode, which is not particularly limited according to the present inventions, preferably is $10^3 \sim 10^9$ Hz.

This is because outside the aforementioned range of RF frequency, sometimes the stability of the low temperature plasma atmosphere declines or the low temperature plasma atmosphere can not be produced. And in such an instable low temperature plasma atmosphere, adequate treating effect might not be obtained.

The active species produced by the low temperature plasma attack the surfaces of powders, forming functional groups which contribute to affinity with vehicle, etc., whereby their affinity with the aforementioned vehicle, etc., is improved. In this example, the powder particles spattered up by the high speed rotational vibration inside the treating chamber 1 come into contact with the low temperature plasma atmosphere which has spatially spread in this treating chamber, whereby they are believed to be uniformly treated. In this instance, like in an ordinary vibrating mill, such a medium as balls, rods, etc., may be put in the treating chamber 1, together with the powders. And in that way, their surfaces may be treated, while further finely pulverizing the powders by means of this medium, thus enabling attainment of further high treating effect.

As the inside of the treating chamber 1 is returned to the state of an atmospheric pressure with the application of RF and the vibration of the reaction chamber 1 suspended, after making the treatment for a given time period, treated powders are obtained.

Figure 2:
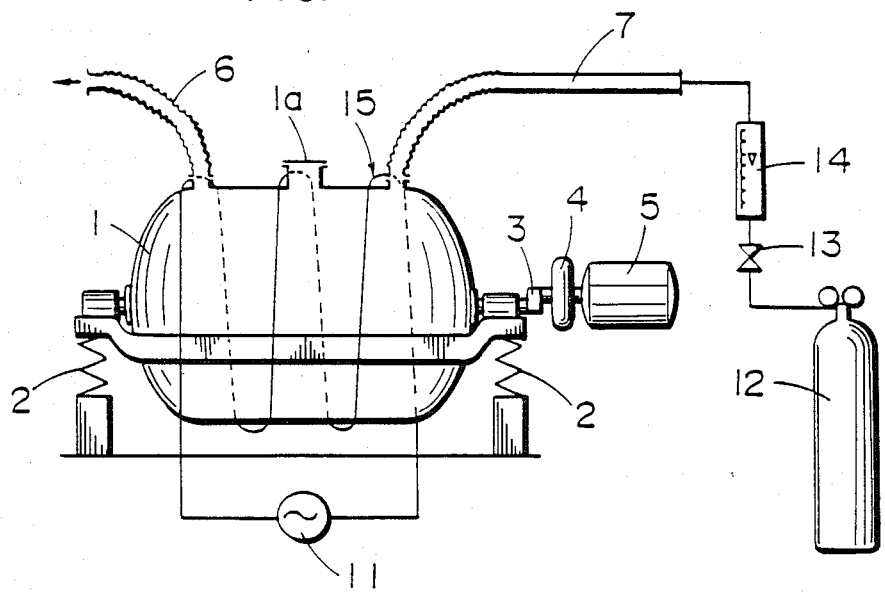
FIG. 2 is a diagram for explanation of another example of such apparatuses based on utilization of high speed rotational vibration.

It should be also noted that while in this example, the composition of the electrodes for applying RF is the so-called capacity type consisting of a pair of electrodes 8 and 9 so placed as to cover the treating chamber 1, the so-called induction type composed of a coil 15, as shown in FIG. 2, will do. Similar conditions of the treatment as in the previous example may be used.

Figure 3:
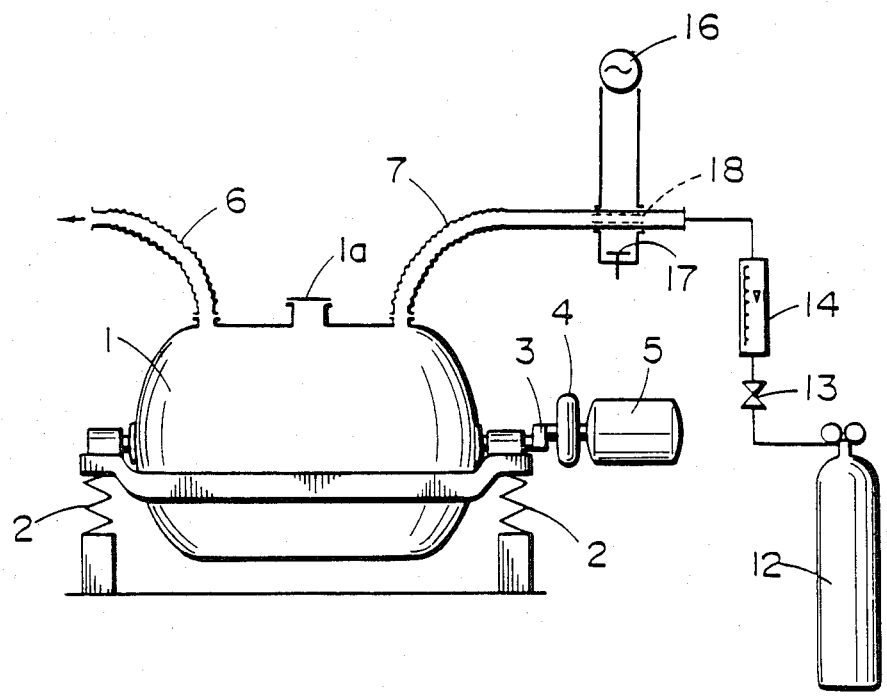
FIG. 3 is a diagram for explanation of still another example of apparatuses based on utilization of high speed rotational vibration.

In the following, use of the apparatus of FIG. 3 is described:

This example differs from the preceding two examples in that the low temperature plasma for treating powders is produced by microwave discharge.

Except for the mechanism for producing the low temperature plasma, this example is not differentiable from the preceding two examples. Thus the treating chamber 1 is held on springs 2 . . . , so that its high speed circular vibration is brought about by the revolution of a motor 5 joined thereto through an eccentric shaft 3 and a rubber joint 4, and the treating chamber 1 is composed with an exhaust pipe 6 which is linked to an exhaust system for bringing the inside of this treating chamber into a state of reduced pressure and a gas pipe 7 for leading the gas used for the treatment into the inside of this treating chamber 1 connected therewith.

The apparatus of this example is devised by taking advantage of the fact that the active species produced by microwaves generally have longer lives than the active species produced by the aforementioned RF discharge. Midway in the gas pipe 7 for supplying the gas into the treating chamber 1, a microwave oscillator 16 and a plunger 17 are installed. The plunger 17 has the function of reflecting the microwaves produced by the microwave oscillator 16. It is used for adjusting the distance from the microwave oscillator 16 by moving it in its axial direction (in the up—down direction in the drawing), thereby controlling the intensity of the microwaves imposed on the gas pipe 7. And the active species produced in the low temperature plasma atmosphere formed between the microwave oscillator 16 and the plunger 17 are blown onto the powders inside the treating chamber 1 through the gas pipe 7, thereby making the low temperature plasma treatment.

When using the apparatus of this example, similarly as in the preceding two examples, the inside of the treating chamber 1 is brought under a condition of reduced pressure, while giving it a high speed rotational vibration, to lead the gas thereinto, thereby bringing the inside of the treating chamber 1 to a specified gas pressure state. The gas pressure inside the treating chamber 1 preferably is $0.01 \sim 10$ Torrs and $0.05 \sim 5$ Torrs is more preferable for the similar reasons as in the previous case.

After setting the inside of the treating chamber 1 to a specified gas pressure, as hereabove described, a low temperature plasma atmosphere 18 is produced in the gas pipe 7 by operating the microwave transmitter 16.

The frequency of the microwave produced by the microwave transmitter 16, which is not particularly limited according to this invention, desirably is within a range of $10^9 \sim 10^{12}$ Hz.

The active species produced in the low plasma atmosphere 18 are carried by the gas coming from the cylinder 12, to be blown onto powders through one end of the gas pipe 7; they attack the powder surfaces, to have formed functional groups which contribute to affinity with vehicle, etc., thereby improving their affinity with the aforementioned vehicle, etc. In this example, uniform treatment is believed to be achieved by the mixing of powder particles spattered up by the high speed rotational vibration inside the treating chamber 1 with the aforementioned active species blown into the treating chamber 1.

As the inside state of the treating chamber 1 is returned to atmospheric pressure, with the microwave discharge and the vibration of the reaction chamber 1 suspended, after making the treatment for a given time period, treated powders are obtained.

In this instance also, if a medium such as balls or rods, etc., for pulverization of solid matters is put in the treating chamber 1, similarly as in a vibrating mill, the surfaces of powders may be treated, while making fine pulverization with this medium, whereby attainment of higher effect of treatment becomes possible.

While in the above-described three examples, powders are stirred by high speed rotational vibration, stirring of powders may be done by other types of vibration according to this invention.

Figure 4:
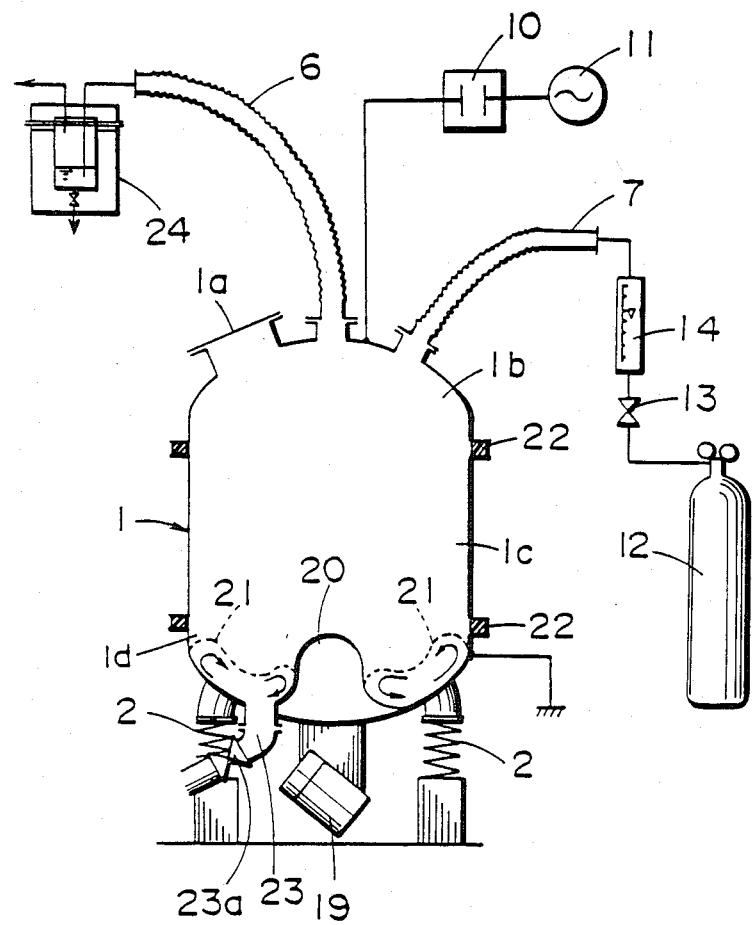
FIG. 4 is a diagram for explanation of an example of apparatuses based on utilization of fluidized layer produced by vibration of those used in exercising the first invention.

An example in which a different vibrational stirring is adopted is shown in FIG. 4.

In the apparatus of this example, the chamber 1 for treating powders is held on a plurality of springs 2 . . . and on the bottom surface thereof, a vibratory motor 19 is obliquely held. The vibration given by the vibratory motor 19 is transmitted to inside the treating chamber 1 through its bottom surface as an obliquely upward going semielliptical vibration. On the bottom surface of the treating chamber 1 interior, a protrusion 20 is formed and the powders 21 are stirred, forming a fluidized layer by making up-down flow in the radial direction, as shown by arrows in the drawing, while swirling around this protrusion 20.

This example is no different from the previous three examples in the construction that an exhaust pipe 6 coupled with an exhaust system for bringing the inside of the treating chamber into a reduced pressure state and a gas pipe 7 for leading in gas used for the treatment are connected to the treating chamber 1. These two pipes 6 and 7 likewise as those of the previously mentioned three examples need to be of a structure which does not transmit vibration to the aforementioned exhaust system or gas supplying section. It is similar as in the previous three examples that the inside wall surfaces of the treating chamber 1 and the two pipes 6 and 7 preferably is subjected to inactivating treatment.

In this example, a low temperature plasma for treating powders is produced by RF (radio wave) discharge. The electrodes for producing the RF discharge are formed by dividing the treating chamber 1 itself. Thus, as seen in the drawing, with the treating chamber 1 divided into three parts—upper, intermediate and lower parts, 1b, 1c and 1d—a pair of electrodes are composed with the upper-most part 1b and the lower-most part 1d.

To the upper side part 1b of the treating chamber 1, an RF power source 11 is linked through a matching unit 10, while the lower side part 1d is grounded.

Before using this apparatus, first, after putting the powders to be treated into the treating chamber 1 through hatch 1a, the air in this treating chamber 1 is exhausted through the exhaust pipe 6 by means of the exhaust system, thereby bringing the inside of the treating chamber 1 into a reduced pressure state.

Simultaneously therewith, vibration of the treating chamber 1 is started by turning the aforementioned vibratory motor 19. The conditions of the vibration, which are not particularly limited also in this example, desirably fall in the range of the number of revolutions of the vibratory motor 19 being $600 \sim 2,400$ rpm ($10 \sim 40$ Hz, as converted into the vibration frequency: converted by the similar calculation as in the aforementioned first embodiment), and the amplitude $2 \sim 10$ mm. As vibrated in this way, the powders put in the treating chamber 1 are stirred, forming a fluidized layer, as hereabove-described.

Then the gas for plasma generation is led in from a cylinder 12 connected to one end of the gas pipe 7 in such a way as to set the gas pressure inside the reaction chamber 1 to a given value. In this figure, 13 denotes a valve for adjusting the amount of the gas supplied to the gas pipe 7 from the cylinder 12; 14, a flow meter for detecting the aforementioned amount of gas; 23, a take-out port for taking the powders 21 out of the treating chamber 1; 23a, a valve; and 24, a gas trap for thwarting the reactive gas, such as $NH_3$, etc., when used, from entering the exhaust system. Obviously, this gas trap 24 is utilizable also in the previous three examples.

As the gases for plasma generation, similar gases as mentioned in the previous three examples may be utilized.

The gas pressure inside the reaction chamber 1 preferably falls in a range of 0.01~10 Torrs, and more preferably 0.05~5 Torrs, for the similar reasons as in the previous three cases.

After setting the inside of the treating chamber 1 to a given gas pressure state as hereabove-described, the aforementioned gas is excited, with an RF of a frequency range ($10^3 \sim 10^9$ Hz) on the same order as that in the previous examples applied on the upper part 1b of the treating chamber 1 by operating an RF power source 11, thereby producing a low temperature plasma atmosphere.

The active species generated in the low temperature plasma attack the surfaces of the powders, causing functional groups which contribute to affinity with vehicle, etc., to be formed, whereby the powders' affinity with the aforementioned vehicle, etc., is improved. In this example, the powders are believed to be treated at high efficiency, because the powders swirl under vibration, while forming a fluidized layer in the treating chamber 1, so that they make uniform contact with the low temperature atmosphere spatially spread inside the treating chamber 1.

After conducting the treatment for a given time period, the application of RF and the vibration of the reaction chamber 1 are suspended and the inside state of the treating chamber 1 is returned to atmospheric pressure, yielding treated powders.

Figure 5:
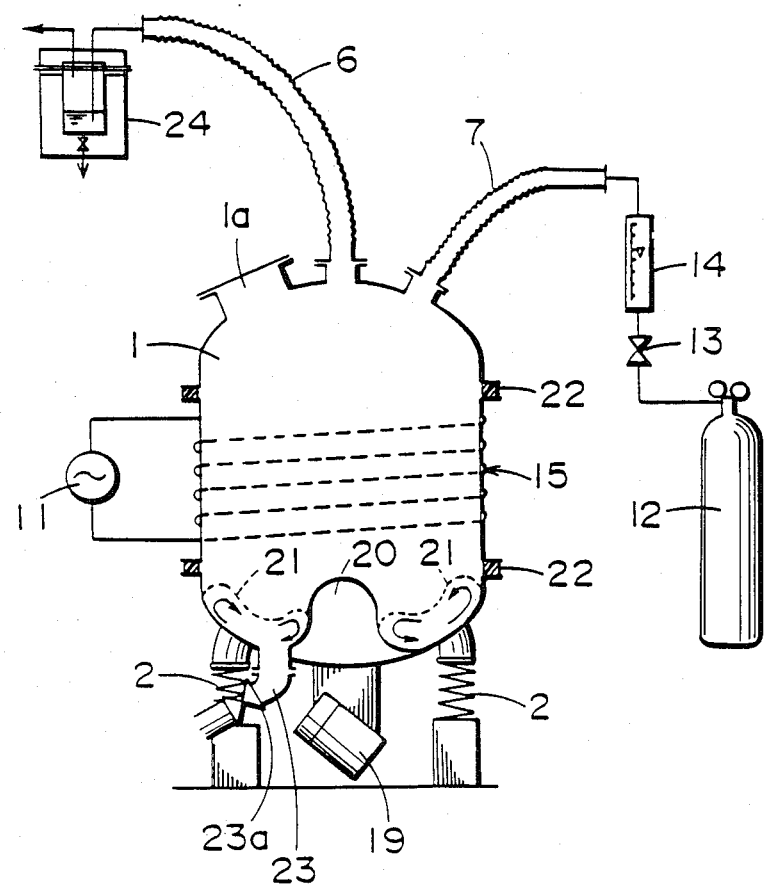
FIG. 5 is a diagram for explanation of another example of those based on utilization of fluidized layer, produced by vibration.

In this example, the electrodes for applying RF are composed by way of dividing the treating chamber 1, but they may be comprised of a pair of electrodes so placed as to cover the treating chamber 1, as in the example of FIG. 1. Or the construction for the RF discharge may be the so-called induction type composed of a coil 15, as seen in FIG. 5, not the so-called capacity type which is composed of a pair of electrodes covering the treating chamber 1 or a pair of electrodes formed by dividing the treating chamber 1. Respective conditions for the treatment may be similarly given as in the previous examples.

Figure 6:
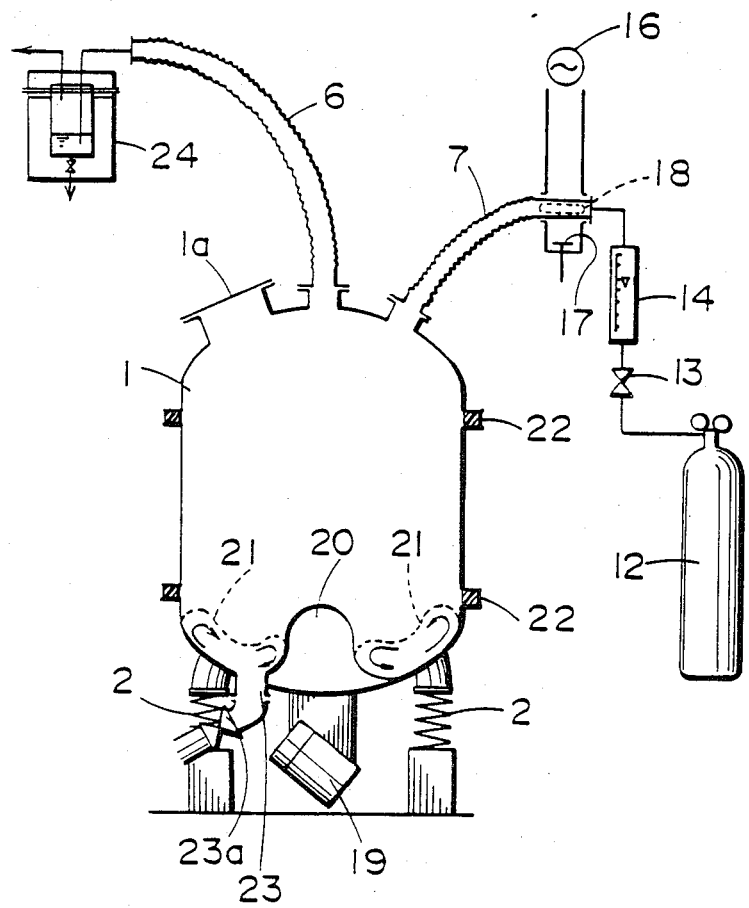
FIG. 6 is a diagram for explanation of still another example of those based on utilization of fluidized layer produced by vibration.

In the following, an example in which use is made of the apparatus of FIG. 6 is explained:

In the apparatus of this example, similarly as in the previous example of FIG. 3, active species produced by microwave discharge are used as the low temperature plasma. Composition of other parts is no different from that of FIG. 4. Thus the treating chamber 1 for treating powders is held on a plurality of springs 2 . . . ; on its bottom a vibratory motor 19 is obliquely mounted and the vibration given by this vibratory motor 19 is transmitted into the treating chamber 1 through its bottom as an obliquely upward going semielliptical vibration relative to the treating chamber 1, whereby the powders 21 are stirred, forming a fluidized layer in which they make up-down flow in the radial direction, as shown by an arrow in the figure, while swirling in the circular direction around the protrusion 20 provided on the bottom surface of the treating chamber 1.

In the apparatus of this example, similarly as in the previous example of FIG. 3, with a microwave oscillator 16 and a plunger 17 provided midway in the gas pipe 7 for supplying gas to the treating chamber 1, the active species generated in the low temperature plasma atmosphere formed between the microwave oscillator 16 and the plunger 17 are blown against the powders inside the treating chamber 1 through the gas pipe 7, thereby making the low temperature plasma treatment.

When making use of the apparatus of this example, similarly as in the example of FIG. 4, the inside of the treating chamber 1 is brought into a reduced pressure state, while letting the powders 21 flowing with a vibration given and, then, the inside of the treating chamber 1 is brought to a given gas pressure state by introducing gas thereinto. The gas pressure inside the treating chamber 1 preferably is 0.01~10 Torrs, and more preferably, 0.05~5 Torrs, for the similar reasons as in the previous instances.

After bringing the inside of the treating chamber 1 into a given gas pressure state as hereabove-described, a low temperature plasma atmosphere 18 is produced in the gas pipe 7 by operating the microwave transmitter 16.

The frequency of the microwave produced by the microwave oscillator 16 desirably falls in the range of $10^9 \sim 10^{12}$ Hz.

The active species generated in the low temperature plasma atmosphere 18 are carried by the gas coming from the cylinder 12, to blow on the powders from one end of the gas pipe 7, attacking the powder surfaces; as a result, functional groups which contribute to affinity with vehicle, etc., are formed, thereby improving the powders' affinity with the aforementioned vehicle, etc. In this example, highly efficient treatment is believed to be made, because the powders swirl, forming a fluidized layer in the treating chamber 1, and make uniform contact with the active species blown into the treating chamber 1.

After making the treatment for a given time period, the microwave discharge and the vibration of the reaction chamber 1 are suspended and the inside pressure of the treating chamber 1 is returned to the atmospheric pressure, yielding treated powders.

In the foregoing, the powder treating method of the first invention is described, when used with the apparatuses of the above-described examples only, but apparatuses employed according to this invention are not limited to those of the above-described examples. For example, in the above-described examples, the method of vibrating powders is based on utilization of high speed rotational vibration or formation of fluidized layer by vibration, but other vibrations may be utilized. And when using apparatuses of the above-described examples, combinations other than the above-mentioned may be employed. For example, the apparatus operated by high speed rotational vibration of FIG. 1 may be combined with electrodes provided by making use of the vessel itself of FIG. 4 or the inverse combination, that is, using electrodes covering the vessel of FIG. 1 for the above-described apparatus based on use of fluidized layer formed by vibration of FIG. 4 will do.

Anyway, no particular restriction will be placed on the composition of the apparatus, if it is usable for making low temperature plasma treatment, while stirring powders by way of vibration.

In the following, the powder treating apparatus, being a second invention, is described in detail in conjunction with FIGS. 7 and 8 which represent an embodiment of this invention.

As hereabove-described, the apparatus for use in exercising the powder treating method of the first invention is not particularly limited, but use of the powder treating apparatus of this second invention is preferable, for high treating efficiency is achieved, when the treatment is conducted using it. FIG. 8 shows the apparatus of FIG. 7, as seen from above.

As seen in these drawings, the powder treating apparatus of this embodiment has its treating chamber 1 for making low temperature plasma treatment of powders such as pigment, etc., contained therein. The treating chamber 1 is formed by mating the openings of the upper and lower two vessels 1e and 1f to one another. In forming it, an insulator 22 is provided at the junction between these vessels, to electrically insulating these upper and lower two vessels 1e and 1f from one another. The lower side vessel 1f insulated by an insulator 22 is used as an exciting electrode on which RF for making the low temperature plasma treatment is to be applied, and the upper side vessel 1e is a grounding electrode, respectively.

The reason why the lower side vessel 1f is used as an exciting electrode in this embodiment is roughly as described hereunder:

The low temperature plasma generated by applying an RF discharge on the exciting electrode is present in the neighborhood of the exciting electrode. Accordingly, when using vessels 1e and 1f composing the treating chamber 1 as opposing electrodes, the treating efficiency may be enhanced by using the lower side vessel 1f with which the powders 21 are always in contact as the exciting electrode. Using the upper side vessel 1e as the exciting electrode involves the following problems enumerated as 1~4, etc. On this account also, use of the lower side vessel 1f as the exciting electrode is preferable.

(1) If the upper side vessel 1e to which the gas pipe for leading in the gas for making the treatment and the exhaust pipe for exhausting the inside of the treating chamber 1 are joined, is used as the exciting electrode, an insulating structure will become indispensable for prevention of leakage of RF from these pipes.

(2) The upper side vessel 1e needs to be dismantled often for cleaning the inside of the treating chamber 1 and, moreover, many pipes are joined thereto, as hereabove-described. Therefore, the structure of the electromagnetic shield will become complex.

(3) Because of the existence of the aforementioned electromagnetic shield, charging-in of material will come difficult.

(4) When high output RF is applied, heat will be evolved from the wire connection between the matching box and the exciting electrode; therefore, coaxial cable can not be used and its configuration will be restricted. For this reason, the matching box needs to be mounted on the electromagnetic shield; but if the upper vessel 1e is used as the exciting electrode, the electromagnetic wave shield itself will vibrate violently during the treatment. Thus, as a matter of fact, the matching box should not be directly mounted thereon.

In fact, if the aforementioned problems (1)~(4), etc., can be solved, it is only proper according to this invention to use the upper side vessel 1e as the exciting electrode.

Whatever insulator 22 will do for insulating the aforementioned two vessels 1e and 1f therebetween, even if they only have literally insulating property, but a material which has a low dielectric constant, which is stable in the low temperature plasma and which permits maintenance of a vacuum state inside the treating chamber 1 is preferable. As such a material, polyacetal resin (for example, Du Pont's DELRIN is known) is used in this example, but it is of course permissible if other materials are put to use.

On the upper side vessel 1e, while bases 71 ... for passing into the treating chamber 1 a plurality of gas pipes 7 ... for leading in gas and a flanged pipe 61 to which an exhaust pipe 6 is connected are provided, a flange 1g is provided on the entire circular end edge at the junction between it and the lower side vessel 1f. A single gas pipe may be enough, but if a plurality of them are provided as in this embodiment, the supply of gas into the treating chamber 1 can be uniform for the benefit of improvement in powder treating efficiency.

The closer to the powders 21 to be treated the place from which the gas used for the treatment is blown against them, the higher the powder treating efficiency. For this reason, the closer to the powders to be treated is the gas pipe 7 end located, the better, but if it is too near so as to be in contact with the powders, the pipe may be plugged thereby. Accordingly, the end edge of the gas pipe 7 is desirably placed at a definite distance of 60 cm or less from the powder surface.

When making plasma treatment with a vibrating device, as hereabove-described, the end edge of the gas pipe 7 is desirably approaches the powder surfaces in order to enhance the treating efficiency. In this instance, however, for installing the gas pipe 7 in the state of projecting into the treating chamber 1, measure for proofing against vibration needs to be taken, resulting in a complex structure. Accordingly, in order to meet the aforementioned two requirements, as shown in FIGS. 7 and 8, a structure of the gas pipe 7 being led into the treating chamber 1 through a side wall of the vessel 1e is preferable.

Since this gas pipe 7 is exposed to the low temperature plasma atmosphere in the treating chamber, it is desirably insulative for prevention of leakage of RF. As an insulative gas pipe, not only one formed of an insulator but one of a metal pipe coated with an insulating material may be utilized. It is also desirable from the standpoint of RF leakage proofing for such a gas pipe 7 to be placed not on the lower side vessel 1f which is connected to RF, but on the upper side vessel 1e which is the grounding side.

On the aforementioned upper side vessel 1e, there are provided peep holes 1i, 1i for observation of inside of the treating chamber 1 and a bag filter 25 for prevention of scattering of powders. The bag filter 25 is housed in a cylindrical part 1j projecting upward from the vessel 1e and in this cylindrical part 1j, there is provided a seat 1k for mounting a pressure gauge for measurement of vacuum degree in the treating chamber 1.

On the lower side vessel 1f, not only a flange 1h to be matched to the aforementioned flange 1g is provided all around its circular end edge at the junction between it and the upper side vessel 1e, but also a protrusion 20 is formed at the internal center. The powders 21 are stirred, forming a fluidized layer in which they make an up-down flow in the radial direction, as shown by the arrows in the drawing, while swirling in a circular direction around this protrusion 20.

The lower side vessel 1f is of an inner and outer double shell structure, such that when making the low temperature plasma treatment, the treating efficiency may be enhanced by passing a heating (or cooling) medium between these two shells. In this drawing, 1l denotes a supply port for supplying the medium, while 1m designates a discharge port for discharging used medium.

At the bottom of the vessel 1f, a take-out port 23 for taking out treated powders is fitted through a valve 23a.

Flanges 1g and 1h on the two vessels 1e and 1f holding an insulator 22 between them are fixed by tightening nuts 27 . . . on bolts 26 . . . piercing therethrough inside of tube 108 and seated on seats 109, whereby these two vessels 1e and 1f are securely set. Before that, the insulator 22 is fixedly mounted on the flange 1g of the upper side vessel 1e by means of bolts 28 . . .

In the drawing, 29, 29 stand for O-rings for keeping the air-tightness where the flanges 1g and 1h and the insulator 22 are securely fastened as hereabove-described; and 30 . . . slingers for hanging up the upper side vessel 1e. As the O-ring 29, use of those made of silicone resin, etc., which are normally used for this purpose is recommended.

The treating chamber 1 formed by putting together two vessels 1e and 1f through an insulator 22 is fixed on a mount 31. According to this invention, the treating chamber 1 preferably has the shape that the ratio of diameter to height falls within a range of 9:1~1:3 or more preferably has a laterally long shape. Because the area where the powders 21 come in contact with the low temperature plasma atmosphere is larger, a resultant higher treating efficiency occurs in a laterally long treating chamber 1 than in a longitudinally long one.

The aforementioned mount 31 is held on a base 32 through rubber springs 2 . . . , while on its side surface, two units of a hydraulic vibratory motor 19' are mounted with their axial directions criss-crossed. The hydraulic vibratory motor 19', like the previously mentioned vibratory motor 19, transmits an obliquely upward going semielliptical vibration to the inside of the treating chamber 1 from its bottom. Accordingly, the aforementioned vibratory motor 19 may be used, but in such a way, the mount 31 on which the motor is mounted is in contact with the lower side vessel 1f which is directly connected with a high frequency power source; and therefore, the risk that RF might be charged on the motor lead wires is high. It is for this reason that in this embodiment a hydraulic vibratory motor 19' which has no such lead wires is employed. The piping for feeding the driving oil to the hydraulic vibratory motor 19' is desirebly made of a material which will not carry RF.

As hereabove-described, around the mount 31 on which the treating chamber 1 is fixed, an electromagnetic wave shield 33 made of mesh, etc., is provided surrounding it. The lower end of the electromagnetic wave shield 33 is fixed on the floor on which the base 32 is placed by means of screws 34, etc., and its upper end is in contact with the flange 1g of the upper side vessel 1e.

The flange 1g, as seen in this figure, is prominent from an overall circle of the apparatus, and is wider than the flange 1h of the lower side vessel 1f and the insulator 22. On this prominent part, the electromagnetic shield 33 is abutted from the lower side. This structure is advantageous in that since the electric connection between the electromagnetic wave shield 33 and the upper side vessel 1e may be made by merely placing the upper side vessel 1e on the lower side vessel 1f, the process for dismounting and mounting of the upper side vessel 1e for cleaning, etc., is further facilitated.

The electromagnetic wave shield 33 is in a grounded state, as above-mentioned, its lower end being in contact with the floor, and its upper end with the upper side vessel 1e being the grounding side, respectively, so that it is possible to completely shield the lower side vessel 1f which is the exciting side and the mount 31 etc.

Since this electromagnetic wave shield 33, being fixed on the floor surface, does not vibrate during the treatment, fitting of a matching box for applying high output RF is easy.

This structure has also the advantages in that since the lower side vessel 1f, not the upper side vessel 1e to which various pipes are connected, is used as the exciting electrode, the insulation of these pipes is made simply. Since the electromagnetic wave shield 33 is surrounding the lower side vessel to which not many pipes are connected, the structure is simplified and charging-in of materials is readily made.

An electromagnetic wave shield 33 is not a necessity according to this invention, but its installation is desirable for prevention of any ill-effect of leaked RF on another equipments and human bodies.

As hereabove-described, use of the apparatus of this embodiment will enable exercising the powder treating method, being the first invention, at higher efficiency.

In the foregoing, the powder treating apparatus, being the second invention, has been described in connection with an embodiment represented by FIGS. 7 and 8, but it is not limited to this embodiment only.

For example, of the upper and lower two vessels 1e and 1f, not the lower side vessel 1f which is used as the exciting electrode in the hereabove-described embodiment, but the upper-side vessel 1e may be utilized as the exciting electrode. In this case, the shape and structure of the electromagnetic wave shield 33 and the respective shapes and structure of pipes 6 and 7, etc., shall be designed to accommodate themselves to the situation. The same is true of the shape and structure of other parts. Thus they are not limited to those of the embodiment represented by the aforementioned figures.

In sum, it is only proper that this apparatus is used for treating powders with low temperature plasma while stirring them by vibration; that while the treating chamber for containing the powders to treat them with low temperature plasma is formed by matching the openings of the upper and lower two vessels to one another, an insulator is provided at the junction of these two vessels, so that they may be electrically insulated from one another, when these upper and lower two vessels are put together; and that these two vessels are designed to be used as mutually facing exciting electrode and grounding electrode. The claims of this invention do not particularly restrict other structural features.

In the following, the third invention is described in detail with reference to drawings illustrating an apparatus for use in exercising it.

Figure 9:
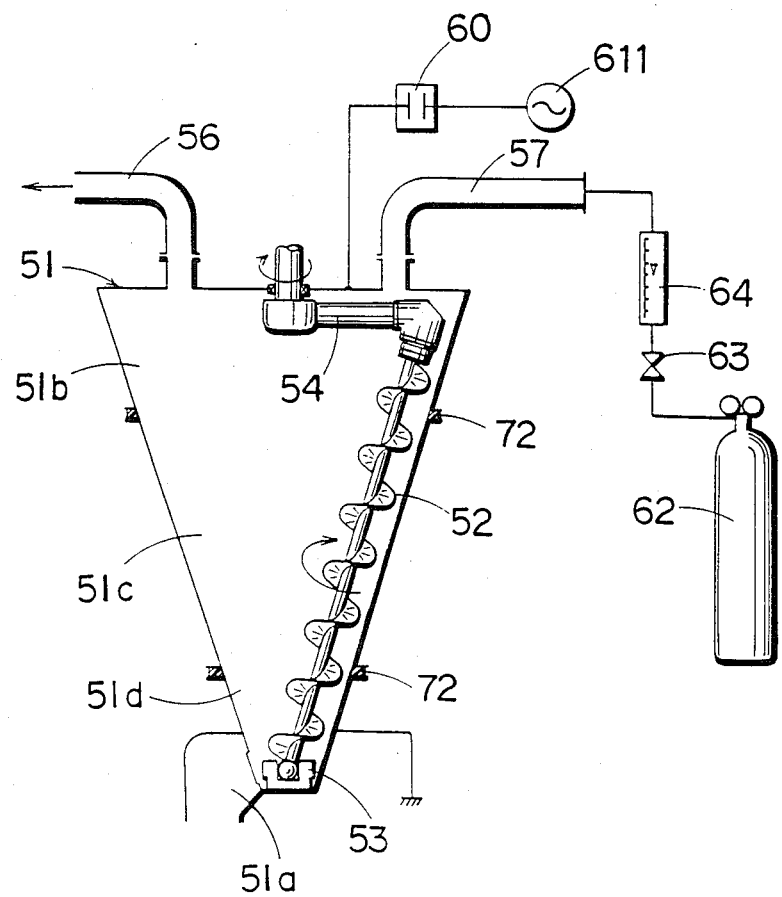
FIG. 9 is a diagram for explanation of an example based on utilization of capacity type RF discharge of apparatuses usable for the third invention.

First, use of the apparatus of FIG. 9 is described.

This apparatus is set up by installing a spiral screw 52 in a nearly conical treating chamber 51. While the lower end of the spiral screw 52 is held by a bearing 53 at the bottom of the treating chamber 51, to its upper end, there is filled a supporting arm 54 in such a way that the arm 54 itself can turn. The arm 54 transmits the power for rotation of the spiral screw 52. Then by turning this supporting arm 54, a precessional movement of the spiral screw 52 centering on the aforementioned bearing 53 is made. In this figure, 51a denotes an outlet for taking out the treated powders.

To the upper surface of this treating chamber 51, there are connected an exhaust pipe 56 linked with an exhaust system and a gas pipe 57 for letting the gas used for the treatment into the treating chamber 51. The inside wall surfaces of these two pipes 56 and 57 and the aforementioned treating chamber 51 are desirably treated for making their surfaces inert. For such a treatment, glass lining or TEFLON (polytetrafluoroethylene, produced by Du Pont) coating, etc., may be mentioned.

In this example, the low temperature plasma for treating powders is generated by RF (radio wave) discharge. The electrodes for generating the RF discharge, in this example, are formed by dividing the treating chamber 51 itself. Thus, as seen in this figure, with the treating chamber 51 divided by insulators 72, 72 into three parts—the upper, intermediate and lower parts 51b, 51c and 51d—, a pair of electrodes is composed of the upper-most part 51b and the lower-most part 51d. While to the upper-most part 51b of the treating chamber 51, an RF power source 611 is connected through a matching unit 60, the lower-most part 51d is grounded.

Before using this apparatus, first, after putting the powders to be treated into the treating chamber 51, the air in the treating chamber 51 is exhausted in the direction shown by an arrow mark in this figure through an exhaust pipe 56 by an exhaust system not shown in this figure, thereby bringing the inside of the treating chamber 51 into a state of a reduced pressure of the order of $10^{-1} \sim 10^{-2}$ Torrs.

In this state, a precessional movement of the spiral screw 52 is made by turning the supporting arm 54, while letting the aforementioned spiral screw 52 rotate. The rotational speed of the spiral screw 52 and the turning speed of the supporting arm 54 is not particularly limited according to this invention. Yet the rotation of the spiral screw 52 is desirably $60 \sim 100$ r.p.m., and the precessional movement $1.5 \sim 2$ r.p.m. The powders are not only turned and stirred by the precessional movement of the spiral screw 52, but stirred by the rotation of the spiral screw 52 in such a way that their upper and lower layers are exchanged.

Then the gas for plasma generation is let into the reaction chamber 51, from a cylinder 62 joined to one end of the gas pipe 57, thereby to make the gas pressure inside the reaction chamber 51 a given value. In this figure, 63 denotes a valve for regulating the amount of gas supplied from the cylinder 62 to the gas pipe 57, and 64 a flow meter for detecting the aforementioned amount of gas.

The gas used for plasma generation, which is not particularly limited in this invention, can be for example selected from among those hereunder-mentioned, to suit the intended use.

Reactive or nonreactive gases such as air, hydrogen, oxygen, ammonia, carbon dioxide, carbon tetrafluoride, nitrogen, argon, helium or the like inorganic gases or ethylene, propylene, benzene, vinyl monomer, and the like organic gases, etc.

The gas pressure inside the reaction chamber 51, which is not particularly limited in this example, is preferably $0.01 \sim 10$ Torrs, and more preferably $0.05 \sim 5$ Torrs, when one or more of the aforementioned gases is used. The reasons why the pressure inside the treating chamber 51 is set in the aforementioned range are as follows. Thus, if the gas pressure inside the treating chamber 51, is less than 0.01 Torr, the concentration of the active species produced in the low temperature plasma atmosphere may be insufficient to achieve high treating effect. On the other hand, if the gas pressure inside the treating chamber 51 is in excess of 10 Torr, the so-called mean free path will become too short, resulting in difficulty of generating the low temperature plasma and instability, even if it can be generated, thus showing a tendency of failing to achieve high treating efficiency. In contrast, if the gas pressure inside the treating chamber 51 falls within the aforementioned range, it is believed possible to obtain stable low temperature plasma atmosphere with which high treating efficiency may be achieved.

As hereabove-described, after the inside of the treating chamber 51 is set to a given gas pressure, RF is applied on the upper-most part 51b of the treating chamber 51 by operating the RF power source 611, to get the aforementioned gas inside the treating chamber 51 excited, thereby generating the low temperature plasma atmosphere.

The frequency of RF impressed on the upper-most part of the treating chamber 51, being the exciting electrode, which is not particularly limited according to this invention, is desirably $10^3 \sim 10^9$ Hz. If the frequency of RF falls outside the aforementioned range, the stability of the low temperature atmosphere will decline or the low temperature plasma atmosphere sometimes may not be produced. And in such an unstable low temperature plasma atmosphere, adequate treating effect may not be achieved.

The active species generated in the low temperature plasma attack the surfaces of the powders, forming thereon functional groups which contribute to affinity with vehicle, etc., whereby their affinity with the aforementioned vehicle, etc., is improved. In this example, it is considered probable that powders are highly efficiently treated, because the aforementioned powders which are not only turned and stirred by the precessional movement of a spiral screw 52, but stirred in such a way that their upper and lower layers are exchanged by the rotation of the spiral screw 52, rotate constantly inside the treating chamber 51, and are brought into uniform contact with the low temperature plasma atmosphere which has been spatially spread inside the treating chamber 51.

Besides, in this example, a pulverization medium such as balls or rods, etc., like those used for pulverization of solid matters in mills may be put in the treating chamber 51, together with the powders. In this way, the surfaces of the powders may be further treated, while finely pulverizing them by the aid of this medium, and therefore, still higher treating effect can be achieved.

After conducting the treatment for a given time period, the application of RF and the movement of the spiral screw 52 are suspended and the pressure of the inside of the treating chamber 51 is returned to the atmospheric pressure, yielding treated powders.

Figure 10:
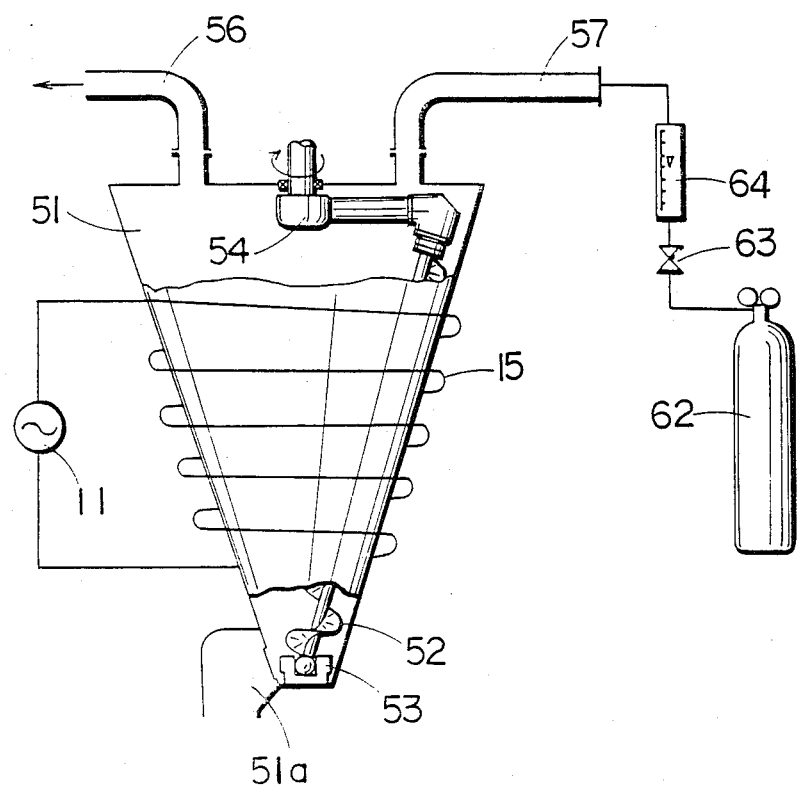
FIG. 10 is a diagram for explanation of an example based on utilization of induction type RF discharge.

Besides, while in this example, the electrodes for applying RF is composed by dividing the treating chamber 51, but the so-called induction type which is composed of a coil 15, as seen in FIG. 10, may be used. Similar conditions for treatment as in the aforementioned example are applicable.

Figure 11:
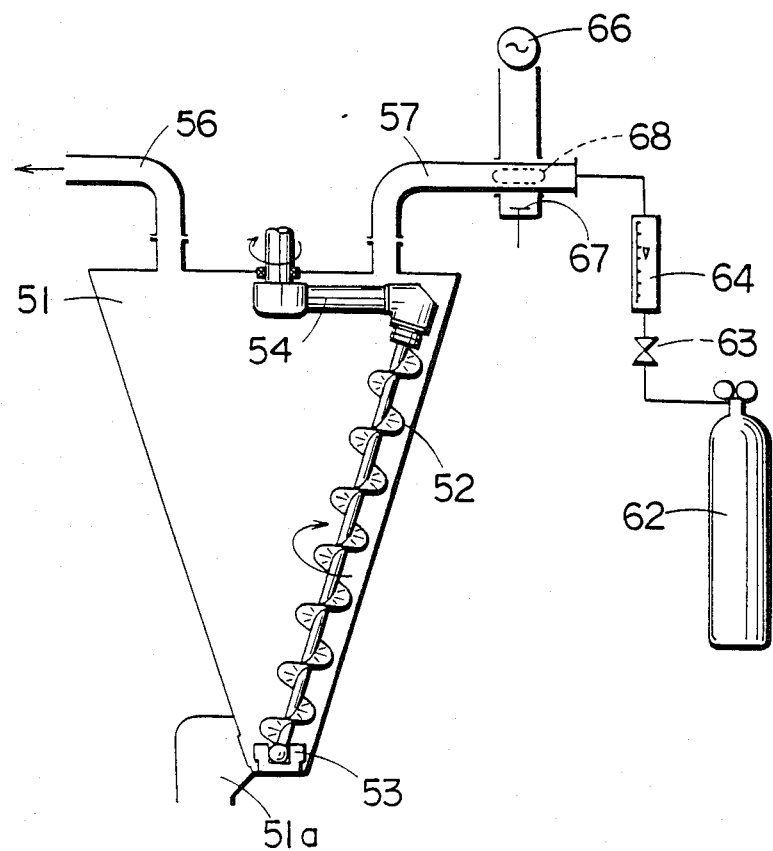
FIG. 11 is a diagram for explanation of an example based on utilization of microwave discharge.

In the following, use of the apparatus of FIG. 11 is described.

This example differs from the above-described two examples in that the low temperature plasma for treating powders is produced by microwave discharge.

Except for the mechanism for producing the low temperature plasma, this example is no different from the preceding two examples. Thus inside a nearly cone-shaped treating chamber 51, a rotatable spiral screw 52 which is designed to make a precessional movement by the turning of the supporting arm 54 is set and on the top of the treating chamber 51, there are connected an exhaust pipe 56 linked to an exhaust system and a gas pipe 57 for letting into this treating chamber 51 the gas to be used for the treatment.

The apparatus of this example takes advantage of the fact that the active species produced by microwave have longer lives than the active species produced by the aforementioned RF discharge. A microwave oscillator 66 and its opposing electrode 67 are installed midway in the gas pipe 57 for supplying gas to the treating chamber 51. The active species generated in the low temperature plasma atmosphere formed between this microwave oscillator 66 and the opposing electrode 67 are blown onto the powders in the treating chamber 51 through a gas pipe 57, whereby the low temperature plasma treatment of powders is performed.

In using the apparatus of this example, similarly as in the preceding two examples, the inside of the treating chamber 51 is brought into a reduced pressure state, while making a precessional movement of a spiral screw 52 and letting it rotate, and then, the inside of the treating chamber 51 is brought to a given gas pressure state by introducing the gas thereinto. The gas pressure inside the treating chamber 51, which is not particularly limited in this example, is desirably be 0.01~10 Torrs, and more preferably, 0.05~5 Torrs, for the similar reasons as in the preceding examples.

After setting the pressure of the inside of the treating chamber 51 to a given one, a low temperature plasma atmosphere 68 is produced in the gas pipe 57 by operating the microwave oscillator 66.

The frequency of the microwave produced by the microwave oscillator 66, which is not particularly restricted according to this invention, falls preferably in the range of $10^9 \sim 10^{12}$ Hz.

The active species which have generated in the low temperature plasma atmosphere 68 are carried by the gas coming from a cylinder 62, and blown onto powders from a terminal of the gas pipe 57; then, they attack powder surfaces, forming thereon functional groups which contribute to affinity with vehicle, etc., whereby their affinity with the aforementioned vehicle, etc., is improved. In this example, the aforementioned powders which are not only turned and stirred by a precessional movement of a spiral screw 52, but stirred by rotation of this spiral screw 52 in such a way that their upper and lower layers are exchanged, continuously whirl in the treating chamber 51, to be mixed with the aforementioned active species which have been blown into this treating chamber 51, whereby their uniform treatment is believed to be performed.

In this example also, if a medium like balls or rods, etc., for pulverization of solid matters just as those used in mills is put in the treating chamber 51, the treatment of powders' surfaces may be made while finely pulverizing the powders by the aid of this medium, whereby still higher treating effect will become attainable.

After conducting the treatment for a given time period, the microwave discharge and the movement of the spiral screw 52 are suspended and the pressure of the inside of the treating chamber 51 is returned to the atmospheric pressure, yielding treated powders.

In the foregoing, description of the powder treating method of the third invention has been made only with the apparatuses of the above-mentioned examples, but the apparatuses used for this invention are not limited to those of the above-mentioned three examples. For example, in the example of FIG. 9, capacity type electrodes are formed by dividing the treating chamber 51 into three parts, but a structure having a pair of electrodes covering the treating chamber 51 is permissible. And those having electrodes of another structure than these may be employed. This means that similar modifications are similarly feasible in other parts, for example, the configuration of the reaction chamber 51 and that of the spiral screw 52 or the movement mechanism of the spiral screw 52, etc., are not limited to the above-mentioned examples represented by the drawings. In sum, the composition of the apparatus is not particularly limited, only if it is usable for making the low temperature plasma treatment, while stirring powders by making a precessional movement of a spiral screw which is being rotated.

In the following, examples embodying these three inventions are described, together with comparative examples:

(EXAMPLES 1~3)

As the powders, organic pigment of quinacridon type was used. It was put in a powder treating apparatus (shown in FIGS. 1~3) based on use of high speed rotational vibration, to be subjected to the low temperature plasma treatment under the conditions shown in Table 1. After the treatment, occurrence of granulation of powders in the treating chamber and their cohesion on the inside wall surface of the treating chamber were examined, and the particle diameters of the treated powders were measured. The results are exhibited in Table 1.

(EXAMPLES 4~6)

Low temperature plasma treatment of powders was conducted similarly as in Examples 1~3, except that a powder treating apparatus making use of fluidized layer formation by vibration (one shown in FIGS. 4~6) was utilized. The results are similarly displayed in Table 1.

(EXAMPLE 7)

The low temperature plasma treatment of powders was conducted similarly as in Example 4, except that the powders were dried under heating before making the treatment. The result are similarly given in Table 1.

(EXAMPLE 8)

The low temperature plasma treatment of powders was conducted similarly as in Example 4, except that the powders are classified with their particle diameters by screening them through a #32 mesh. The results are similarly listed in Table 1.

(COMPARATIVE EXAMPLE 1)

The low temperature plasma treatment of powders was conducted similarly as in Example 1, except that the stirring of powders is made by turning of a drum. The results are similarly put up in Table 1 and Table 3.

(COMPARATIVE EXAMPLE 2)

The low temperature plasma treatment was performed similarly as in Example 1, except that the stirring of powders is made by revolution of a propeller. The results are similarly given in Table 1 and Table 3.

(EXAMPLE 9)

Figure 7:
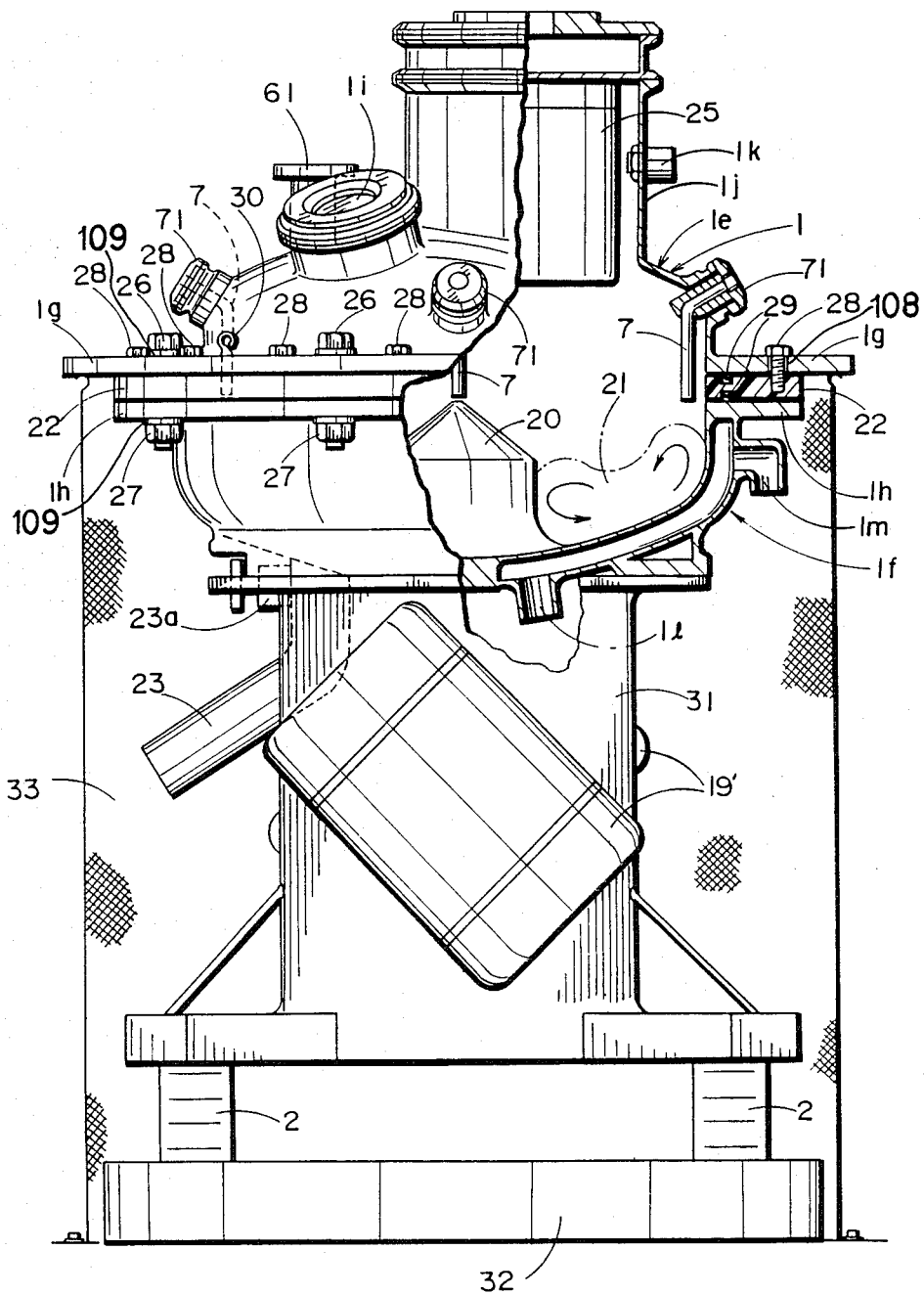
FIG. 7 is a partly broken front view showing a example of the powder treating apparatus, being the second invention.
Figure 8:
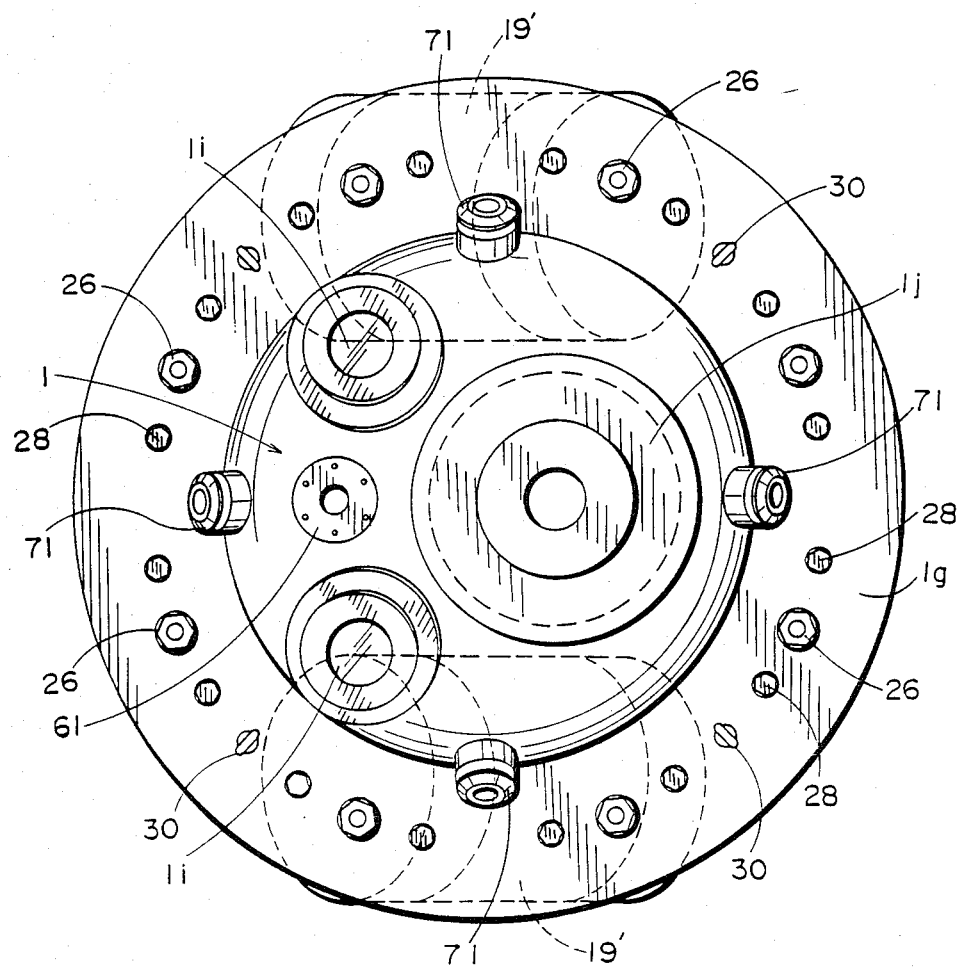
FIG. 8 is a plain view of this example of apparatus.

The low temperature plasma treatment was carried out similarly as in Example 4, except that as the powder treating apparatuses, the one shown in FIGS. 7 and 8 was used. The results are put up in Table 2.

(EXAMPLE 10)

The low temperature plasma treatment of powders was conducted similarly as in Example 9, except that of the upper and lower two vessels, the upper side vessel was used as the exciting electrode, and the lower side vessel as the grounding electrode. The results are similarly listed in Table 2.

(EXAMPLE 11)

The low temperature plasma treatment of powders was conducted similarly as in Example 9, except that the ratio of diameter to height of the treating chamber comprised of upper and lower two vessels was set at 1:1. The results are similarly shown in Table 2.

(EXAMPLE 12)

The low temperature plasma treatment of powders was conducted similarly as in Example 9, except that one end of the gas pipes is located at a distance of 30 cm from the surface of powders put in the treating chamber. The results are similarly put up in Table 2.

(EXAMPLE 13)

The low temperature plasma treatment of powders was conducted similarly as in Example 9, except that only one gas pipe was used. The results are similarly displayed in Table 2.

(EXAMPLE 14)

The low temperature plasma treatment of powders was conducted similarly as in Example 9, except that the uncoated stainless steel pipes were used as the gas pipes. The results are similarly exhibited in Table 2.

(EXAMPLES 15~17)

As the powders, organic pigment of quinacridon series type was used. It was subjected to a low temperature plasma treatment under the conditions shown in Table 3 in a powder treating apparatus of the compositions of FIGS. 9~11. After the treatment, occurrence of granulation of powders in the treating chamber and their cohesion on the inside wall surface of the treating chamber were examined and the particle diameter of the treated powders was measured. The results are displayed in Table 3.

The treating efficiency was evaluated by making the following measurements, using the pigment powders treated in the above-described Examples and Comparative examples:

Water dispersibility: After stirring under given conditions pigment powders which had been treated with low temperature plasma together with water in a test tube, the mixture was left standstill and the suspending state of pigment particles was observed.

Viscosity: Pigment powders which had been treated with the low temperature plasma were dispersed in alkid resin, to be a paste and its apparent viscosity was measured at 19.2 $s^{-1}$, using an E type viscometer.

Yield value: The yield value of the same paste used in the aforementioned viscosity measurement was determined by Casson Plot.

Flow coated luster: With the aforementioned paste turned into a coating, flow coated luster was measured at 20° gloss.

The results of the above-mentioned measurements are listed in Tables 1, 2 and 3 where o shows a state of good water dispersibility without cluster or mass of powders on the surface or at the bottom of the water; Δ shows a state of fair water dispersibility, with some clusters or masses of powders precipitated at the bottom of the water or with the water in the upper portion being transparent though the powders are dispersed at the bottom; and x shows a state of poor dispersibilty, with dry powders floating in the water surface, or a mass or a cluster of powders sunk at the bottom and almost all the water is almost transparent, i.e., powders hardly dispersed in water.

TABLE 1

| | Example | | | | |
|---|---|---|---|---|---|
| | 1 | 2 | 3 | 4 | 5 |
| Vibration type | High speed rotational vibration | High speed rotational vibration | High speed rotational vibration | Vibrating flow | Vibrating flow |
| Particle movement conditions*1 | 30 Hz Amplitude 7 mm pig/beads = 1/1 | 30 Hz Amplitude 7 mm pig/beads = 1/1 | 30 Hz Amplitude 7 mm pig/beads = 1/1 | 30 Hz Amplitude 3 mm | 30 Hz Amplitude 3 mm |
| Plasma treatment conditions | Gas: oxygen Gas pressure: 1 Torr High frequency: RF (capacity type) Output: 60 W Treating time: 3 hr | Gas: oxygen Gas pressure: 1 Torr High frequency: RF (Induction type) Output: 60 W Treating time: 3 hr | Gas: oxygen Gas pressure: 1 Torr High frequency: microwave Output: 1.5K W Treating time: 6 hr | Gas: oxygen Gas pressure: 1 Torr High frequency: RF (capacity type) Output: 60 W Treating time: 3 hr | Gas: oxygen Gas pressure: 1 Torr High frequency: RF (induction type) Output: 60 W Treating time: 3 hr |
| State after the treatment | | | | | |
| Granulation | Not occurred. | Not occurred. | Not occurred. | Not occurred. | Not occurred. |
| Cohesion on wall | Not occurred. | Not occurred. | Not occurred. | Not occurred. | Not occurred. |
| Particle diameter of powder (μm) | 60~100 | 60~100 | 60~100 | 100~400 | 100~400 |
| Dispersibility | | | | | |
| Water dis- | o | o | o | o | o |

TABLE 1-continued

|  | | | | | |
|---|---|---|---|---|---|
| persibility | | | | | |
| Viscosity (cP) | 100 | 95 | 150 | 120 | 110 |
| Yield value | 1.0 | 1.0 | 3.0 | 2.0 | 1.5 |
| Flow coated luster | 80 | 82 | 79 | 80 | 80 |

|  | Example | | | Comparative example | |
|---|---|---|---|---|---|
|  | 6 | 7 | 8 | 1 | 2 |
| Vibration type | Vibrating flow | Vibrating flow | Vibrating flow | Drum turning | Propeller |
| Particle movement conditions*[1] | 30 Hz Amplitude 3 mm | 30 Hz Amplitude 3 mm Subjected to heat drying treatment | 30 Hz Amplitude 3 mm Subjected to classification treatment | 60 rpm pig/beads = 1/1 | 300 rpm |
| Plasma treatment conditions | Gas: oxygen Gas pressure: 1 Torr High frequency: microwave Output: 1.5 kW Treating time: 6 hr | Gas: oxygen Gas pressure: 1 Torr High frequency: RF(capacity type) Output: 60 W Treating time: 3 hr | Gas: oxygen Gas pressure: 1 Torr High frequency: RF(capacity type) Output: 60 W Treating time: 3 hr | Gas: oxygen Gas pressure: 1 Torr High frequency: RF (capacity type) Output: 60 W Treating time: 3 hr | Gas: oxygen Gas pressure: 1 Torr High frequency: RF (capacity type) Output: 60 W Treating time: 3 hr |
| State after the treatment | | | | | |
| Granulation | Not ocurred. | Not occurred. | Not occurred. | Occurred. | Occurred. |
| Cohesion on wall | Not ocurred. | Not occurred. | Not occurred. | Occurred. | Occurred. |
| Particle diameter of powder (μm) | 100~400 | 100~400 | 100~400 | Unrecoverable | 900 |
| Dispersibility | | | | | |
| Water dispersibility | o | o | o | x | Δ |
| Viscosity (cP) | 130 | 110 | 100 | Unmeasurable | 320 |
| Yield value | 5.0 | 1.0 | 1.0 | Unmeasurable | 17 |
| Flow coated luster | 75 | 81 | 83 | Unmeasurable | 51 |

*[1]Pig/beads stands for a ratio of pigment to medium.

TABLE 2

|  | Example | | | | | |
|---|---|---|---|---|---|---|
|  | 9 | 10 | 11 | 12 | 13 | 14 |
| Vibration type | Vibrating flow | Vibrating flow | Vibrating flow | Vibrating flow | Vibrating flow | Vibrating flow |
| Particle movement conditions | 30 Hz Amplitude 3 mm | 30 Hz Amplitude 3 mm | 30 Hz Amplitude 3 mm | 30 Hz Amplitude 3 mm | 30 Hz Amplitude 3 mm | 30 Hz Amplitude 3 mm |
| Plasma treatment conditions | Gas: oxygen Gas pressure: 1 Torr High frequency: RF (capacity type) Output: 60 W Treating time: 3 hr | Gas: oxygen Gas pressure: 1 Torr High frequency: RF (capacity type) Output: 60 W Treating time: 3 hr | Gas: oxygen Gas pressure: 1 Torr High frequency: RF (capacity type) Output: 60 W Treating time: 3 hr | Gas: oxygen Gas pressure: 1 Torr High frequency: RF (capacity type) Output: 60 W Treating time: 3 hr | Gas: oxygen Gas pressure: 1 Torr High frequency: RF (capacity type) Output: 60 W Treating time: 3 hr | Gas: oxygen Gas pressure: 1 Torr High frequency: RF (capacity type) Output: 60 W Treating time: 3 hr |
| Apparatus conditions | | | | | | |
| Exciting electrode | Lower | Upper | Lower | Lower | Lower | Lower |
| Diameter: height ratio | 3:2 | 3:2 | 1:1 | 3:2 | 3:2 | 3:2 |
| Gas pipe - powder distance (cm) | 5 | 5 | 5 | 30 | 5 | 5 |
| Number of gas pipes | 4 | 4 | 4 | 4 | 1 | 4 |
| Material of gas pipe | Insulator pipe | Insulator pipe | Insulator pipe | Insulator pipe | Insulator pipe | Stainless steel pipe |

TABLE 2-continued

| | Example | | | | | |
|---|---|---|---|---|---|---|
| | 9 | 10 | 11 | 12 | 13 | 14 |
| State after the treatment | | | | | | |
| Granulation | Not occurred. | Not occurred. | Not occurred. | Not occurred. | Not occurred. | Not occurred. |
| Cohesion on wall | Not occurred. | Not occurred. | Not occurred. | Not occurred. | Not occurred. | Not occurred. |
| Particle diameter of powder ($\mu$m) | 100 ~400 | 100 ~400 | 100 ~400 | 100 ~400 | 100 ~400 | 100 ~400 |
| Dispersibility | | | | | | |
| Water dispersibility | o | o | o | o | o | o |
| Viscosity (cP) | 100 | 100 | 130 | 140 | 130 | 120 |
| Yield value | 0.8 | 1.0 | 2.0 | 3.0 | 2.0 | 1.5 |
| Flow coated luster | 85 | 82 | 80 | 78 | 81 | 80 |

TABLE 3

| | Example | | | Comparative example | |
|---|---|---|---|---|---|
| | 15 | 16 | 17 | 1 | 2 |
| Type of stirring | Rotation and precession | Rotation and precession | Rotation and precession | Drum turning | Propeller |
| Stirring conditions*1 | Rotation: 60 r.p.m. Precession: 2 r.p.m. pig/beads=¼ Gas: oxygen Gas pressure: 1 Torr | Rotation: 60 r.p.m. Precession: 2 r.p.m. pig/beads=¼ Gas: oxygen Gas pressure: 1 Torr | Rotation: 60 r.p.m. Precession: 2 r.p.m. pig/beads=¼ Gas: oxygen Gas pressure: 1 Torr | 60 r.p.m. pig/beads=1/1 Gas: oxygen Gas pressure: 1 Torr | 300 r.p.m. Gas: oxygen Gas pressure: 1 Torr |
| Plasma treating conditions | High frequency: RF (Capacity type) Output: 60 W Treating time: 3 hrs | High frequency: RF (Induction type) Output: 60 W Treating time: 3 hrs | High frequency: Microwave Output: 1.5 KW Treating time: 6 hrs | High frequency: RF (Capacity type) Output: 60 W Treating time: 3 hrs | High frequency: RF (Capacity type) Output: 60 W Treating time: 3 hrs |
| State after the treatment | | | | | |
| Occurrence of granulation | Not occurred. | Not occurred. | Not occurred. | Occurred. | Occurred. |
| Occurrence of cohesion on wall surface | Not occured | Not occurred. | Not occurred. | Occurred. | Occurred. |
| Powders' particle diameter ($\mu$m) | 180 | 180 | 180 | Unrecoverable | 900 |
| Dispersibility | | | | | |
| Water dispersibility | o | o | o | X | Δ |
| Viscosity (cP) | 100 | 110 | 130 | Unrecoverable | 320 |
| Yield value | 0.0 | 1.0 | 5.0 | Unrecoverable | 17 |
| Flow coating luster | 82 | 80 | 75 | Unrecoverable | 51 |

*1Pig/beads stands for a ratio of pigment to medium.

The results of Table 1 indicated that in Examples 1~8 where the powder treating method of the first invention was utilized, more uniform and effective treatment was able to be made than in Comparative Examples 1 and 2 which represent the conventional powder treating method. And the results of Table 2 showed that in Examples 9~14 where the powder treating apparatuses of the second invention were utilized, the treating efficiency was able to be further improved. Also, from the results of Table 3, it turned out that more uniform and efficient treatment was made in Examples 15~17 which were based on utilization of the powder treating method of the third invention, as compared with Comparative Examples 1 and 2 either of which represents the conventional powder treating method.

By the powder treating method of the first invention which comprises conducting low temperature plasma treatment of powders, while stirring them by vibration, uniform, efficient treatment can be made. And by using the powder treating apparatus of the second invention, the treatment by the method of the first invention can be made more efficiently. According to the powder treating method of the third invention, as hereabove-described, the low temperature plasma treatment of powders is performed, while stirring them by making the precessional movement of a spiral screw which is being rotated, whereby their uniform and efficient treatment will become possible.

We claim:
1. A powder treating apparatus comprising:
a treating chamber for housing powders, said treating chamber being formed by an upper vessel and a lower vessel each having an opening mated to one another, powders for treatment being placed in said lower vessel, said lower vessel being an exciting electrode, said upper vessel being a grounding electrode, a ratio of diameter to height of the treating chamber falling in a range of 9:1 to 1:3;
a vibration means for vibrating the treating chamber to stir said powders to form a fluidized layer;

a plasma producing means, in which the powders in the treating chamber are treated in a reduced state of pressure and with low temperature plasma while stirring the powders by vibration; and an insulator being provided at a junction between the upper and lower vessels so as to electrically insulate the upper and lower vessels, so that the upper and lower vessels may be utilized as mutually facing exciting electrode and grounding electrode.

2. The powder treating apparatus in accordance with claim 1 wherein the vibration means for the treating chamber is a hydraulic vibrating motor.

3. The powder treating apparatus in accordance with claims 1 or 2 wherein an electromagnetic shield is provided around the vessel on a side that serves as an exciting electrode of the upper and lower two vessels.

4. The power treating apparatus in accordance with claims 1 or 2 wherein a gas pipe for leading in a gas for powder treatment is provided on the vessel on a side that serves as a grounding electrode.

5. The powder treating apparatus in accordance with claims 1 or 2 further including a gas pipe wherein one end of the gas pipe is located at a distance of 60 cm or less above the surface of the powders put in the treating chamber.

6. The powder treating apparatus in accordance with claims 1 or 2 wherein a plurality of gas pipes are connected thereto.

7. The powder treating apparatus in accordance with claims 1 or 2 further including a gas pipe wherein the gas pipe is at least a pipe formed of an insulating material.

8. The powder treating apparatus in accordance with claims 1 or 2 further including a gas pipe wherein the gas pipe is a metal pipe coated with an insulating material.

* * * * *